US012769878B2

(12) United States Patent
Phulphagar et al.

(10) Patent No.: US 12,769,878 B2
(45) Date of Patent: Oct. 20, 2026

(54) SYSTEM AND METHOD FOR ENFORCING ANALYTICAL OUTPUT COMPLIANCE QUERYING ENVIRONMENTS

(71) Applicant: Truata Limited, Dublin (IE)

(72) Inventors: Vipul Phulphagar, Dublin (IE); Imran Khan, Dublin (IE); Michael Fenton, Greystones (County Wicklow) (IE); James Grimes, Greystones (County Wicklow) (IE); Maurice Coyle, Dublin (IE); Mark Vanni, Ridgefield, CT (US); Aydin Ulas, Dublin (IE); Noel Rogers, Dublin (IE)

(73) Assignee: TRUATA LIMITED, Dublin (IE)

( * ) Notice: Subject to any disclaimer, the term of this patent is extended or adjusted under 35 U.S.C. 154(b) by 0 days.

(21) Appl. No.: 18/623,532

(22) Filed: Apr. 1, 2024

(65) Prior Publication Data

US 2025/0307464 A1 Oct. 2, 2025

(51) Int. Cl.
*G06F 21/60* (2013.01)
*G06F 21/62* (2013.01)

(52) U.S. Cl.
CPC .......... *G06F 21/6254* (2013.01); *G06F 21/60* (2013.01); *G06F 21/6227* (2013.01)

(58) Field of Classification Search
CPC ............. G06F 21/6254; G06F 21/6227; G06F 21/60
USPC ........................................................... 726/26
See application file for complete search history.

(56) References Cited

U.S. PATENT DOCUMENTS

| | | | | |
|---|---|---|---|---|
| 10,803,201 | B1 * | 10/2020 | Nicholls | G06F 21/6227 |
| 11,380,429 | B1 * | 7/2022 | Suther | G06F 8/61 |
| 2010/0077006 | A1 * | 3/2010 | El Emam | G06F 16/284 707/E17.032 |
| 2010/0332537 | A1 * | 12/2010 | El Emam | G06F 21/6254 707/E17.131 |
| 2011/0258206 | A1 * | 10/2011 | El Emam | G06Q 30/02 707/754 |
| 2016/0154978 | A1 * | 6/2016 | Baker | G06F 16/285 726/26 |
| 2017/0103232 | A1 * | 4/2017 | Scaiano | G16H 10/60 |
| 2017/0124351 | A1 * | 5/2017 | Scaiano | H04L 63/0421 |
| 2017/0169253 | A1 * | 6/2017 | Curcio | G06F 21/6254 |
| 2017/0177907 | A1 * | 6/2017 | Scaiano | G06F 21/6254 |

(Continued)

*Primary Examiner* — Thanh T Le
(74) *Attorney, Agent, or Firm* — Pillsbury Winthrop Shaw Pittman LLP

(57) ABSTRACT

A system and method that allows privacy-enhanced querying to occur, where re-identification risk is reduced to a user-configured level are described. The system and method include a query federation agent that analyses and augments user-submitted queries to include results that contain metadata relating to the privacy characteristics. The system and method ensure results that contain privacy risks above defined thresholds are suppressed or altered so that re-identification cannot occur. The system and method add noise to results that contain privacy risks above defined thresholds so that re-identification cannot occur. The system and method utilize a data profile that defines the sources of potential re-identification risk in a database schema. The system and method apply privacy rules that are configurable for different database tables and configurable thresholds for different types of privacy risks.

18 Claims, 6 Drawing Sheets

(56) References Cited

U.S. PATENT DOCUMENTS

| | | | | |
|---|---|---|---|---|
| 2018/0004978 | A1* | 1/2018 | Hebert | G06F 16/2457 |
| 2018/0114037 | A1* | 4/2018 | Scaiano | G06F 21/6254 |
| 2019/0138749 | A1* | 5/2019 | Kim | G06F 21/6254 |
| 2019/0228183 | A1* | 7/2019 | Choi | G06F 16/2379 |
| 2019/0303618 | A1* | 10/2019 | Gkoulalas-Divanis | G06F 21/6254 |
| 2020/0311308 | A1* | 10/2020 | Arbuckle | G06F 21/6254 |
| 2021/0165913 | A1* | 6/2021 | Besanson | G06Q 10/00 |
| 2021/0279219 | A1* | 9/2021 | Fenton | G06F 16/221 |
| 2021/0279367 | A1* | 9/2021 | Khan | G06F 21/577 |
| 2022/0129584 | A1* | 4/2022 | Blackport | G06F 21/577 |
| 2022/0253561 | A1* | 8/2022 | Regensburger | A61K 31/519 |
| 2022/0293280 | A1* | 9/2022 | Baker | G16H 50/30 |
| 2022/0414262 | A1* | 12/2022 | Degioanni | G06N 5/02 |
| 2023/0058906 | A1* | 2/2023 | Jansen | G06F 21/6254 |
| 2023/0148326 | A1* | 5/2023 | Papel | G06F 21/6254 726/26 |
| 2023/0351036 | A1* | 11/2023 | Gilmore | G06F 21/6245 |
| 2024/0020415 | A1* | 1/2024 | Zhang | G06F 21/6254 |
| 2024/0249014 | A1* | 7/2024 | Regensburger | G06F 21/6227 |

* cited by examiner

SYSTEM AND METHOD FOR ENFORCING ANALYTICAL OUTPUT COMPLIANCE QUERYING ENVIRONMENTS

FIELD OF INVENTION

The present invention is related to the re-identification risk in data sets, and more particularly, to a system and method for preventing re-identification risk in querying environments otherwise known as query settings.

BACKGROUND

Products or processes available on the market generally offer "privacy-enhancing technologies" (or "PETs"). These PETs include anonymization techniques, adding noise, differential privacy, homomorphic encryption, and secure multiparty computation, among other techniques. Anonymization techniques include, but are not limited to, tokenization, generalization, perturbation, masking and binning that alter returned results so their values are not easily matched with actual data. Commercial offerings incorporating one or more PETs have been brought to market with increasing frequency in recent years. Adding noise using a variety of techniques, including differential privacy, to returned results is included in certain products and PETs on the market. The addition of noise to returned results is intended to make re-identification more difficult even when many queries are submitted in sequence. Homomorphic encryption allows queries to be executed over encrypted data without first decrypting the data. Secure multiparty computation includes systems where parts of a calculation are handled by different processing entities and combined when complete to ensure no single processing entity has access to the full data.

Anonymization techniques suffer from a trade-off between privacy and analytic utility. This trade-off means that increasing one of either privacy or utility decreases the other. When the results of the analysis are to be used in commercial settings or to make important decisions, utility must be preserved to some degree. Striking the right balance between privacy and utility is a key requirement for PETs to be effective.

Although homomorphic encryption and secure multiparty computation do not suffer from this trade-off for supported analytical processes, they can limit the scope of analysis that can be performed and therefore reduce utility in other ways. In addition, they represent security rather than privacy enhancements. If the security of the technologies is compromised (stolen decryption key, brute-force attacks, etc.), there is no protection for individuals' data. Homomorphic encryption is very computationally expensive and is not yet feasible to use in most practical commercial settings for this reason. As well as this, scalability of homomorphic encryption in production environments is still an open challenge.

SUMMARY

A system and method that allows privacy enhanced querying to occur, where re-identification risk is reduced to a configurable level are described. The system and method at its most fundamental form takes as input data and a query to be evaluated over that data and returns a privacy enhanced output. This output can be in the form of an augmented query, a privacy safe output data, or a combination of both with additional metadata. The system can be further augmented with user defined privacy thresholds and metadata.

A system and method that allows privacy-enhanced querying to occur, where re-identification risk is reduced to a configurable level are described. The system and method include a query federation agent that analyses and augments user-submitted queries to add privacy-related metadata to the returned results. The system and method provide results within which privacy risks above defined thresholds are suppressed or altered so that re-identification risks are reduced. In one embodiment, the system and method may add noise to results that contain privacy risks above defined thresholds so that re-identification risk is reduced to a defined level. This noise may be produced using a differential privacy mechanism and the system may be configured to ensure that the output achieves differential privacy to a specified level. The system and method may guarantee that the output results achieve differential privacy to a defined level. The system and method may include adding deterministic noise in combination with differential privacy-inspired noise. The system and method utilize a data profile that defines the sources of potential re-identification risk in a database schema. The system and method apply privacy rules that are configurable for different database tables and configurable thresholds for different types of privacy risks. Further, the system and method score aggregated query results relative to the configured privacy rules and thresholds. The system and method measure the privacy risks in database query results and mitigate the risks before returning the query results to the user. The mitigation actions may be configured to run automatically under defined circumstances. The mitigation actions may be presented to an administrator and selected mitigation actions may be applied to query results before being returned to the user. Mitigation actions include suppression of all or part of a returned row in the result set, suppression of the entire result set, transformation or addition of noise to the values of certain fields or records to reduce their re-identification risk, storage of suppressed rows or result sets for use as part of subsequent queries, display of statistics relating to suppressed records, aggregation beyond the defined privacy rules and thresholds, aggregation of only the riskiest records in a result set, among other techniques.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1:
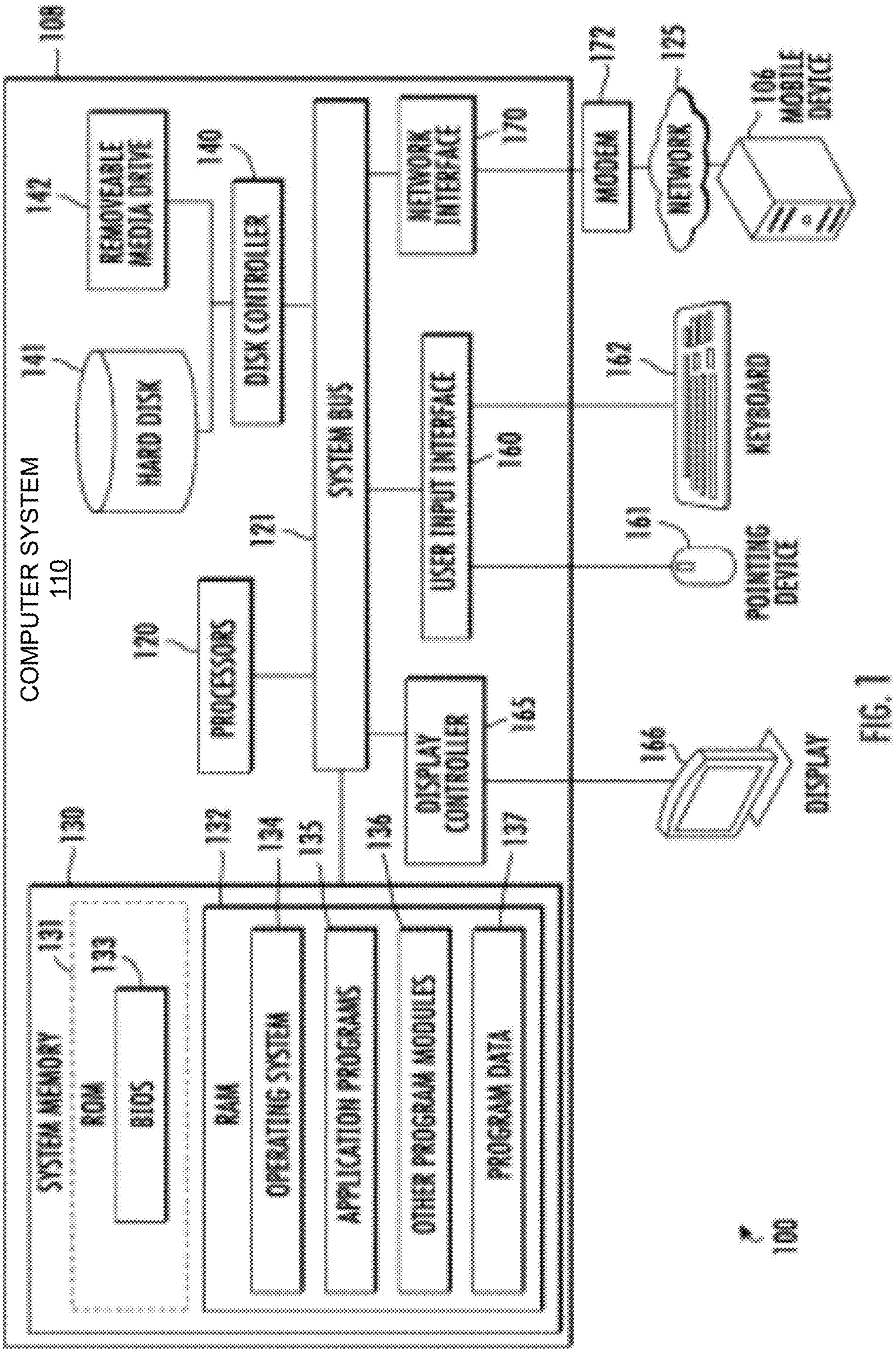
FIG. 1 is a system diagram of an example of a computing environment in communication with a network.

This system and method ensures that only aggregated results (with risk mitigation techniques applied before as well as after aggregation) that pass the defined privacy thresholds may be returned. This system and method differs from other PETs in that only certain Resultsets, also referred to as Resultsets and/or result sets, are altered by the query federation agent, and these can be supplemented with statistics or other data assets such that the user can still extract some utility. For other queries where the query federation agent detects no privacy issues, utility is maximized as the result set is returned in its entirety. The system and method includes support for querying use cases and contexts and optimal reduction in final analytic output quality due to maximization of the typical privacy-utility trade-off.

The system and method involves adding a query federation agent to a database querying system. Such a query federation agent may include an application programming interface (API), in certain examples. This agent receives a query from a user and augments the query so that the results returned in response to it contain metadata about the results that allows calculation of associated privacy or re-identification risks. This metadata can be used by the agent to automatically alter the results returned to the user or to provide a number of options that can be taken to deliver analytical value while reducing re-identification risk to a configurable level. The alterations that can be applied to the results of a query can include suppressing entire records or result sets, adding noise to certain records, and producing aggregations of risky records or noisy aggregations so that analytical integrity is maintained.

Deployment may occur in any querying setting or interface to enhance the privacy of individuals' data while delivering valuable insights from data assets.

Systems that data scientists and data analysts use to execute queries against a database can enable the re-identification of individuals in the database, even if steps have been taken to prevent it. Preventing data subject-level granularity in result sets via the aggregation of query responses can be effective in reducing the privacy risk posed by re-identification.

However, aggregate-only query responses may still be prone to re-identification attacks, in cases where the query response has very few data subjects contributing to the aggregated value or if outliers contribute a large percentage to the aggregated value or if a very large percentage of the total population contribute to it. Where a query aggregates results by sequential segments or segments at different levels of granularity for the same variables, differencing attacks may be possible. Differencing attacks are possible where the difference in data subject or event counts between 2 segments is low and where the segments are organized hierarchically, i.e. one segment is a superset or at a different level of granularity from the other. Therefore, applying privacy controls besides aggregations is required to make the query responses privacy safe. Differencing attacks may also include configurations using a where condition between two queries, in certain examples. Applying techniques such as suppression, generalization, perturbation/noise addition or masking to alter the values returned for a query can achieve this goal. In particular adding noise calibrated to achieve differential privacy ensures that where two outputs differ by just a single subject, it should not be possible to distinguish that data subject.

Modern database tables have many columns and combining relatively few columns can form a quasi-identifier with high resolving power for database records or data subjects. Thus, removing re-identification risk from such a dataset would require a significant number of columns to be affected, which would be very likely to negatively affect analytic outputs generated from the schema.

This system and method describes a querying system that can analyze and augment a user-submitted query and its Resultset to determine what level of re-identification risk is present in the results. The system can then provide the user with preventative options or automatically alter the query or query output to ensure re-identification is reduced to preconfigured levels.

A query may take the form as would be understood in the art, including, but not limited to, SQL instructions, scala code, spark code, datalog, and essentially any language or library that supports querying over data.

In one embodiment, the system may handle batch queries, as well or on demand queries. Batch Query enables the user to request outputs for queries with long-running CPU processing times. Thus a pre-defined set of queries may be submitted to the system allowing the system to output private results to the pre-defined set of queries.

Similarly, in an embodiment, the system may support interactive querying, where a user of the system may query the system to generate a private output. Then based on the private output to the interactive query, the user may craft another query to generate another output. This successive query may be applied in an iterative process.

End-users may be allowed to generate aggregated Resultsets from a database in which re-identification risk is reduced to a configurable level. This requires that any output produced is automatically tested by a privacy engine described herein to ensure that the data is sufficiently protected to ensure that re-identification is not possible from the resulting data set.

Data may also take any of a number of formats, as would be understood in the art, including, but not limited to, a CSV file, a structured database of many tables, a DataFrame, objected-oriented databases, a JSON object, essentially any format or data structure that supports the storage of data.

A system and method that allows privacy enhanced querying to occur, where re-identification risk is reduced to a configurable level are described. The system and method at its most fundamental form takes as input data and a query to be evaluated over that data and returns a privacy enhanced output. This output can be in the form of an augmented query, a privacy safe output data, or a combination of both with additional metadata. The system can be further augmented with user defined privacy thresholds and metadata.

Data may also take any format, a CSV file, a structured database of many tables, a DataFrame, objected-oriented databases, a JSON object, essentially any format or data structure that supports the storage of data.

The system can take many formats, and it could exist by itself, it can form part of a larger system that has a requirement for privacy enhancing technologies. It can be run as a single pass system or as part of a multi-step (multi-query) pipeline with and without interaction between steps.

The system and method provide results within which privacy risks above defined thresholds are suppressed or altered so that re-identification risks are reduced. In one embodiment, the system and method may also add noise to results that contain privacy risks above defined thresholds so that re-identification risk is reduced to a defined level. The system and method utilize a data profile that defines the sources of potential re-identification risk in a database schema. The system and method apply privacy rules that are configurable for different database tables and configurable thresholds for different types of privacy risks. Further, the system and method score aggregated query results relative to the configured privacy rules and thresholds. The system and method measure the privacy risks in database query results and mitigate the risks before returning the query results to the user. The mitigation actions may be configured to run automatically under defined circumstances. The mitigation actions may be presented to an administrator and selected mitigation actions may be applied to query results before being returned to the user. Mitigation actions include suppression of all or part of a returned row in the result set, suppression of the entire result set, transformation or addition of noise to the values of certain fields or records to reduce their re-identification risk, storage of suppressed rows or result sets for use as part of subsequent queries, display of statistics relating to suppressed records, aggregation beyond the defined privacy rules and thresholds, aggregation of only the riskiest records in a result set, among other techniques.

FIG. 1 is a system diagram of an example of a computing environment 100 in communication with a network. In some instances, the computing environment 100 is incorporated in a public cloud computing platform (such as Amazon Web Services or Microsoft Azure), a hybrid cloud computing platform (such as HP Enterprise OneSphere) or a private cloud computing platform. As shown in FIG. 1, computing environment 100 includes a remote computing system 108 (hereinafter computer system), which is one example of a computing system upon which embodiments described herein may be implemented.

The remote computing system 108 may, via processors 120, which may include one or more processors, perform various functions. The functions may be broadly described as those governed by machine learning techniques. Generally, any problems that can be solved within a computer system. As described in more detail below, the remote computing system 108 may be used to provide (e.g., via display 266) users with a dashboard of information, such that such information may enable users to identify and prioritize models and data as being more critical to the solution than others.

As shown in FIG. 1, the computer system 110 may include a communication mechanism such as a bus 121 or other communication mechanism for communicating information within the computer system 110. The computer system 110 further includes one or more processors 120 coupled with the bus 121 for processing the information. The processors 120 may include one or more CPUs, GPUs, or any other processor known in the art.

The computer system 110 also includes a system memory 130 coupled to the bus 121 for storing information and instructions to be executed by processors 120. The system memory 130 may include computer readable storage media in the form of volatile and/or nonvolatile memory, such as read-only system memory (ROM) 131 and/or random-access memory (RAM) 132. System memory 130 may contain and store the knowledge within the system. The system memory RAM 132 may include other dynamic storage device(s) (e.g., dynamic RAM, static RAM, and synchronous DRAM). The system memory ROM 131 may include other static storage device(s) (e.g., programmable ROM, erasable PROM, and electrically erasable PROM). In addition, the system memory 130 may be used for storing temporary variables or other intermediate information during the execution of instructions by the processors 120. A basic input/output system 133 (BIOS) may contain routines to transfer information between elements within computer system 110, such as during start-up, that may be stored in system memory ROM 131. RAM 132 may comprise data and/or program modules that are immediately accessible to and/or presently being operated on by the processors 120. System memory 130 may additionally include, for example, operating system 134, application programs 135, other program modules 136 and program data 137.

The illustrated computer system 110 also includes a disk controller 140 coupled to the bus 121 to control one or more storage devices for storing information and instructions, such as a magnetic hard disk 141 and a removable media drive 142 (e.g., floppy disk drive, compact disc drive, tape drive, and/or solid-state drive). The storage devices may be added to the computer system 110 using an appropriate device interface (e.g., a small computer system interface (SCSI), integrated device electronics (IDE), Universal Serial Bus (USB), or FireWire).

The computer system 110 may also include a display controller 165 coupled to the bus 121 to control a monitor or display 166, such as a cathode ray tube (CRT) or liquid crystal display (LCD), for displaying information to a computer user. The illustrated computer system 110 includes a user input interface 160 and one or more input devices, such as a keyboard 162 and a pointing device 161, for interacting with a computer user and providing information to the processor 120. The pointing device 161, for example, maybe a mouse, a trackball, or a pointing stick for communicating direction information and command selections to the processor 120 and for controlling cursor movement on the display 166. The display 166 may provide a touch screen interface that may allow inputs to supplement or replace the communication of direction information and command selections by the pointing device 161 and/or keyboard 162.

The computer system 110 may perform a portion or each of the functions and methods described herein in response to the processors 120 executing one or more sequences of one or more instructions contained in a memory, such as the system memory 130. These instructions may include the flows of the machine learning process(es) as will be described in more detail below. Such instructions may be read into the system memory 130 from another computer readable medium, such as a hard disk 141 or a removable media drive 142. The hard disk 141 may contain one or more data stores and data files used by embodiments described herein. Data store contents and data files may be encrypted to improve security. The processors 120 may also be employed in a multi-processing arrangement to execute one or more sequences of instructions contained in system memory 130. In alternative embodiments, hard-wired circuitry may be used in place of or in combination with software instructions. Thus, embodiments are not limited to any specific combination of hardware circuitry and software.

As stated above, the computer system 110 may include at least one computer readable medium or memory for holding instructions programmed according to embodiments described herein and for containing data structures, tables, records, or other data described herein. The term computer readable medium as used herein refers to any non-transitory, tangible medium that participates in providing instructions to the processor 120 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 141 or removable media drive 142. Non-limiting examples of volatile media include dynamic memory, such as system memory 130. Non-limiting examples of transmission media include coaxial cables, copper wire, and fiber optics, including the wires that make up the bus 121. Transmission media may also take the form of acoustic or light waves, such as those generated during radio-wave and infrared data communications.

The computing environment 100 may further include the computer system 110 operating in a networked environment using logical connections to local computing device 106 and one or more other devices, such as a personal computer (laptop or desktop), mobile devices (e.g., patient mobile devices), a server, a router, a network PC, a peer device or other common network node, and typically includes many or all of the elements described above relative to computer system 110. When used in a networking environment, computer system 110 may include modem 172 for establishing communications over a network, such as the Internet. Modem 172 may be connected to system bus 121 via network interface 170, or via another appropriate mechanism.

Network 125, as shown in FIG. 1, may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 110 and other computers (e.g., local computing device 106).

Figure 2:
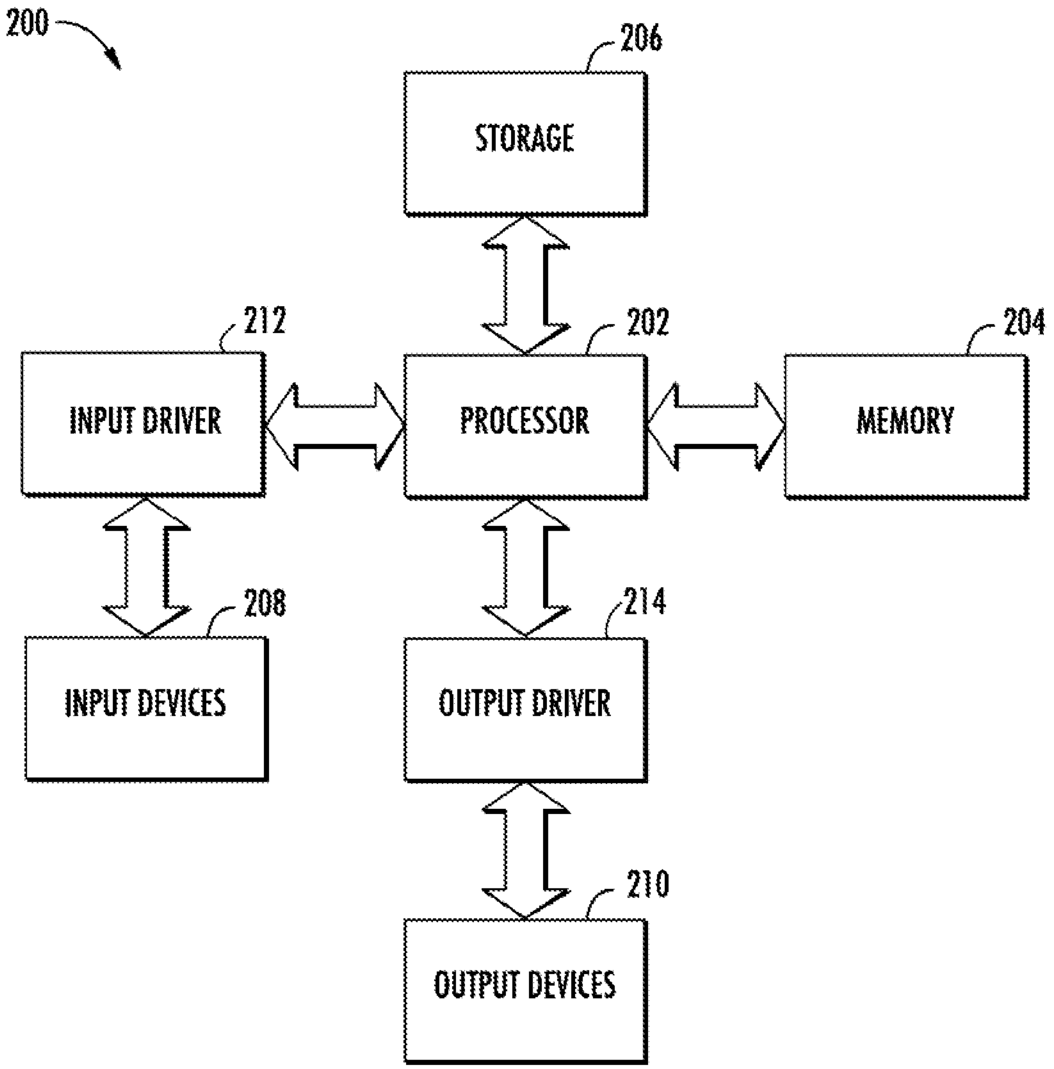
FIG. 2 is a block diagram of an example device in which one or more features of the disclosure can be implemented.

FIG. 2 is a block diagram of an example device 200 in which one or more features of the disclosure can be implemented. The device 200 may be local computing device 106, for example. The device 200 can include, for example, a computer, a gaming device, a handheld device, a set-top box, a television, a mobile phone, or a tablet computer. The device 200 includes a processor 202, a memory 204, a storage device 206, one or more input devices 208, and one or more output devices 210. The device 200 can also optionally include an input driver 212 and an output driver 214. It is understood that the device 200 can include additional components not shown in FIG. 2 including an artificial intelligence accelerator.

In various alternatives, the processor 202 includes a central processing unit (CPU), a graphics processing unit (GPU), a CPU and GPU located on the same die, or one or more processor cores, wherein each processor core can be a CPU or a GPU. In various alternatives, the memory 204 is located on the same die as the processor 202 or is located separately from the processor 202. The memory 204 includes a volatile or non-volatile memory, for example, random access memory (RAM), dynamic RAM, or a cache.

The storage device 206 includes a fixed or removable storage means, for example, a hard disk drive, a solid-state drive, an optical disk, or a flash drive. The input devices 208 include, without limitation, a keyboard, a keypad, a touch screen, a touchpad, a detector, a microphone, an accelerometer, a gyroscope, a biometric scanner, or a network connection (e.g., a wireless local area network card for transmission and/or reception of wireless IEEE 802 signals). The output devices 210 include, without limitation, a display, a speaker, a printer, a haptic feedback device, one or more lights, an antenna, or a network connection (e.g., a wireless local area network card for transmission and/or reception of wireless IEEE 802 signals).

The input driver 212 communicates with the processor 202 and the input devices 208, and permits the processor 202 to receive input from the input devices 208. The output driver 214 communicates with the processor 202 and the output devices 210, and permits the processor 202 to send output to the output devices 210. It is noted that the input driver 212 and the output driver 214 are optional components, and that the device 200 will operate in the same manner if the input driver 212 and the output driver 214 are not present.

Figure 3:
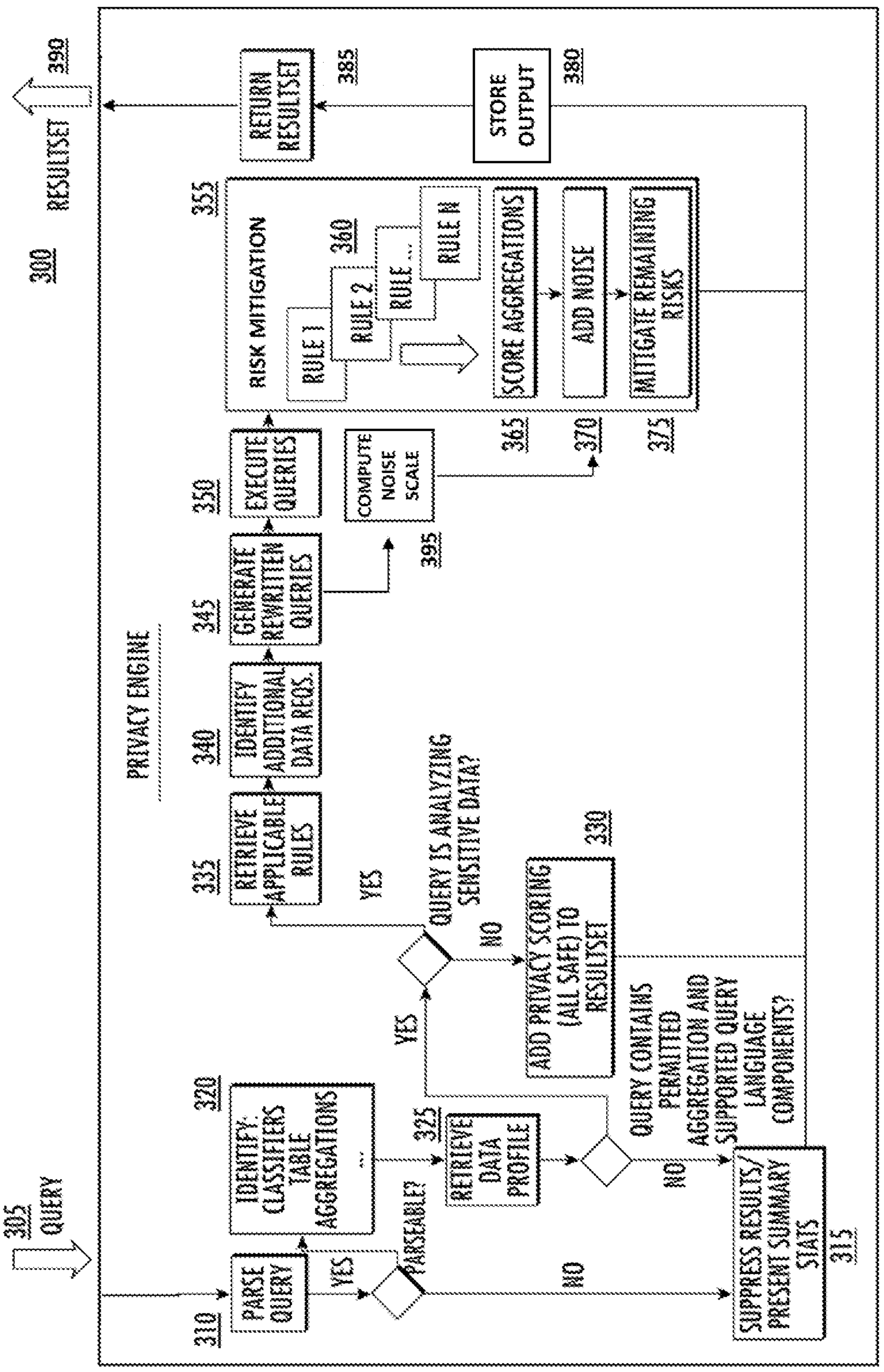
FIG. 3 illustrates a system for the privacy engine of the present description.

FIG. 3 illustrates a system 300 for the privacy engine of the present description. System 300 may operate within a system of devices as described above with respect to FIGS. 1 and 2. FIG. 3 depicts the overall privacy engine workflow where a set of queries are rewritten and executed to contain metadata enabling privacy thresholds to be enforced, and mitigation techniques including but not limited to noise addition are applied to address remaining residual re-identification risks. Specifically, system 300 includes a query 305, that is parsed 310. If the query 305 is not able to be parsed in the parse query 310, the results may be suppressed from being presented to the user and summary statistics presented at 315. If the query 305 is able to be parsed at 310, the classifiers, tables, aggregations and other commonly occurring query components may be identified at 320. The data profile may be retrieved at 325, containing information about the data sets referenced in the query, sensitive fields, fields that are not permitted in aggregations, etc. If the query 305 does not contain permitted aggregations in the identification module at 325, the results may be suppressed and summary statistics presented at 315. If the query 305 does contain permitted aggregations in the identification module at 320, a check for whether sensitive data is being analyzed may be performed.

If the query 305 is not analyzing sensitive data, privacy scoring identifying all records as being safe is added to the Resultset at 330. If the query is analyzing sensitive data, the applicable rules may be retrieved at 335, additional requirements are identified at 340, rewritten queries are generated at 345, and queries executed at 350.

Risk mitigation may be employed at 355. This may include a series of rules 360, score aggregations 365, noise added 370 and remaining risks mitigated at 375. The noise added (or in some examples rewritten in the query, collectively referred to as added) at 370 may prevent or mitigate against certain other kinds of re-identification such as differencing attacks. The noise added may result in providing differential privacy guarantees or result in a differentially private result set. Achieving differential privacy may require an optional calibration step 395 where the impact of each data subject on the Resultset is determined and noise is scaled accordingly to ensure differential privacy is met. This step could be performed for a query which consists of an aggregation over multiple data subjects.

Once the results are suppressed and summary statistics presented at 315, privacy scoring identifying all results as being safe is added to Resultset at 330 or the privacy threshold tests at 355 the Resultset or summary stats may be returned at 385 and Resultset or summary stats exported at 390.

System 300 is progressed using an example query 305 and each step is described in greater detail below. The example query 305 is provided to aid in the understanding of the present invention, while any query may be used in the actual system. The example aggregation query 305 includes: "select location_id, count(*) as total_transactions from retail_transactions where issue_country='IRL' group by location_id order by location_id".

As presented above the query 305 is parsed at 310. The query is parsed at 310 to create a hierarchical map of the structure of the query 305. This created map enables the identification of entities, classifiers (i.e., case statements in certain examples), identifiers, aggregations, and other query components, at 320 that exist in the query 305.

The query 305 may not be parseable in which case an empty result set may be returned and the results may be suppressed, and summary statistics presented at 315. The data response may include a code to indicate that an error (and possibly identifying the error) occurred and include a privacy score (privacy in an instance where an error has occurred, or an empty result set has been returned is acceptable as there is no data returned). As illustrated in Table 1 below, the query in question has returned an empty result set and an error code indicating what kind of error occurred.

TABLE 1

| RESPONSE TO QUERY | | |
|---|---|---|
| Execution Result Code | | 123 |
| ResultSet Data | location_id | total_transactions |

If the query 305 is able to be parsed at 310, the classifiers, tables and aggregation may be identified at 320. This identification 320, based in the query 305 being parseable at 310, identifies the constituent tables, columns, aggregations, and other commonly occurring query components. Aggregation vocabulary supported by the querying language ("GROUP BY", "SUM", "COUNT", etc.) are defined by the query language specification. At this point the query may be rejected for delivery of the Resultset to the analyst, because there is no permitted aggregation at the top level of the query or that the way the query is constructed (e.g., too complex, containing unpermitted query components) is not supported, the results may be suppressed and summary statistics presented at 315.

The Resultset may still be made available for subsequent queries, with privacy risk metadata (event/data subject counts) being aggregated in these subsequent queries and subject to parsing and testing by the system 300.

In the case where a Resultset cannot be shown directly to the user, they can be informed that the Resultset has been stored in a temporary table and is available for querying/aggregation as part of subsequent queries at 380. Statistical summaries of these Resultsets may be provided so that the user can understand the nature of their contents. Alternatively, or additionally, a synthetic version of the Resultset may be presented to the user to aid in understanding the kind of data that was returned, without being able to re-identify an individual.

At 325 the data profile is retrieved. The system 300 may query a data catalogue service to determine the data profile of the customer schema or data set. The data profile may inform which tables in the customer schema contain data that is considered sensitive, which columns are the sensitive ones, whether each table is event-level or data subject-level and which fields are permitted to be used for aggregating result sets. For temporary tables which have been created as part of previous input queries, the data profile may include a record of whether the temporary table has been rendered safe through the addition of noise, as described herein. Any table which contains sensitive data may be aggregated and have a privacy analysis performed. Retrieving at 325 the profile data may identify if the results of query 305 require privacy analysis or if query 305 may be passed straight through. If the query 305 is not analyzing sensitive data, privacy scoring identifying all records as safe is added to the Resultset at 330. If the query is analyzing sensitive data, the applicable rules may be retrieved at 335, additional requirements are identified at 340, rewritten queries are generated at 345, and queries executed at 350.

If the retrieved 325 data profile indicates that there are no sensitive tables in the query 305, a successful execution code and privacy safe flag may be returned along with the result set from the execution at 330. The example aggregation query 305 includes: "select Country_code, count(*) as total_merchants from merchant_locations group by Country_code" and the result is illustrated in Table 2 below. The result set for a query counting records relating to total merchants in a particular country may be presented to the user as it does not contain information derived from sensitive tables.

TABLE 2

| AGGREGATION QUERY RESULT | | |
|---|---|---|
| Execution Result Code | | 1 |
| ResultSet Data | Country_code | total_merchants |
| | . . . | . . . |
| | 102 | 387 |
| | 103 | 234 |
| | 104 | 2345 |
| | 105 | 234 |
| | 106 | 532 |
| | 107 | 53 |
| | . . . | . . . |

If the Data Profile indicates that there are sensitive tables in the query, the applicable privacy rules which apply to the relevant tables may be retrieved at 335. In an embodiment, the applicable privacy rules for a table may be included in the retrieved 325 Data Profile. The retrieved 325 data profile for example retailer's transaction table may identify the Minimum Participation requirements as illustrated in Table 3 below. Minimum Participation refers to the minimum number of entities (data subjects or transactions in the example below) required for a record or cell within a record to be considered safe from a privacy perspective.

TABLE 3

MINIMUM PARTICIPATION REQUIREMENTS

| Table | Field | Field Type | Min Participation |
|---|---|---|---|
| retail_transactions | card_number | Single | 1000 |
| retail_transactions | seq_num<br>trans_date | Combination | 500 |

The relevant rules retrieved at 330 may identify supplementary data that may be required in order to perform the privacy check for that specific rule and also the thresholds to check against the resulting data.

Additional data requirements may be identified at 340. Based on the privacy rules retrieved at 325 associated with the tables in the query 305 there may be additional data required to risk assess the outputs. For example, in the example query, identifying that retail_transactions is a sensitive table because contains a card_number field. For the purposes of this illustration, the rules associated with this are for example Minimum Participation, Maximum Contribution, Minimum Count, Near Total and Maximum Population. The Minimum Participation may include at least a set value of unique card_number values present in each resulting segment. Such a set value may be 100, 1000, or 10, for example. The Maximum Contribution set forth that no unique card_number may account for more than a threshold of the values in each segment, row or field in the Resultset. Such a value, as an example, may be 50%, 60%, 70%, 75%.

The Minimum Count may include any aggregated representation of data may include a minimum of X unique events or records. The Near Total may include the value of an aggregation for a segment or cohort of data subjects may not be with X % of the aggregates value for the entire population. The Maximum Population may include the number of data subjects that contribute to the rows or columns of a Resultset not to exceed X % of the total population.

The system 300 can support an extendable set of rules with the examples listed above including just a subset of those possible. New rules may be added in response to specific client requirements, developments in re-identification risk research, etc. Each privacy rule at 335 has an attached set of controls. There are generic controls applicable to queries and rules, and each rule may have specific controls related to the associated privacy requirement. Some exemplary generic controls and rule-specific controls are provided below.

Generic controls include those such as any query referencing a table with Minimum Participation constraints that requires a GROUP BY clause. Any nested query referencing a table with Minimum Participation constraints requires a GROUP BY clause in the outer query. Any query referencing a table with Minimum Participation constraints must contain an aggregation (Sum, Count, Average, etc.) but cannot include MIN or MAX. Any nested query referencing a table with Minimum Participation constraints must contain an aggregation (Sum, Count, Average, etc.) in the outer query but cannot include MIN or MAX. Generic controls can be created for any of the privacy rules retrieved at 325.

Minimum Participation controls ensure that each aggregation segment for which Minimum Participation constraints apply must consist of a minimum number of unique attributes representing data subjects (e.g., customer_id) as defined by its threshold.

Maximum Contribution controls ensure that any individual attribute representing data subjects e.g., customer_id, cannot contribute more than X % of the value of each aggregated field where X is defined by the threshold for that attribute.

Minimum Count controls ensure that the output from a query referencing a table with Minimum Count constraints cannot contain an aggregated segment constructed from fewer records from that table than the Minimum Count threshold without perturbation.

Near Total controls ensure that the output from a query referencing a table with Near Total constraints cannot contain an aggregated segment constructed from a percentage of the overall (total) population in the original dataset exceeding the Near Total threshold without perturbation.

Rewritten queries may be generated at 345. This generation produces a final query set to be executed. Additional clauses and fields may be added to the query 305 to ensure metadata such as data subject, event/record counts, other sensitive attribute counts and maximum values are contained in the Resultset and any other data requirements as defined in the data profile. These metadata values may be read and further aggregated from the source tables of the query 305 if the query is accessing a table that already contains them. In some cases, additional new queries may be executed to obtain the required information. In some embodiments, these additional queries may also be used to obtain values to calibrate the level of noise that will be added to the final query output. Such new queries may be generated and executed at this stage. In some cases, queries or the result returned for a query may have noise added to further prevent re-identification to occur, particularly where so-called "hierarchical differencing attacks" are possible. The flow for rewriting the query to include information required to assess the privacy characteristics is depicted in FIG. 4A,B.

Figure 4A:
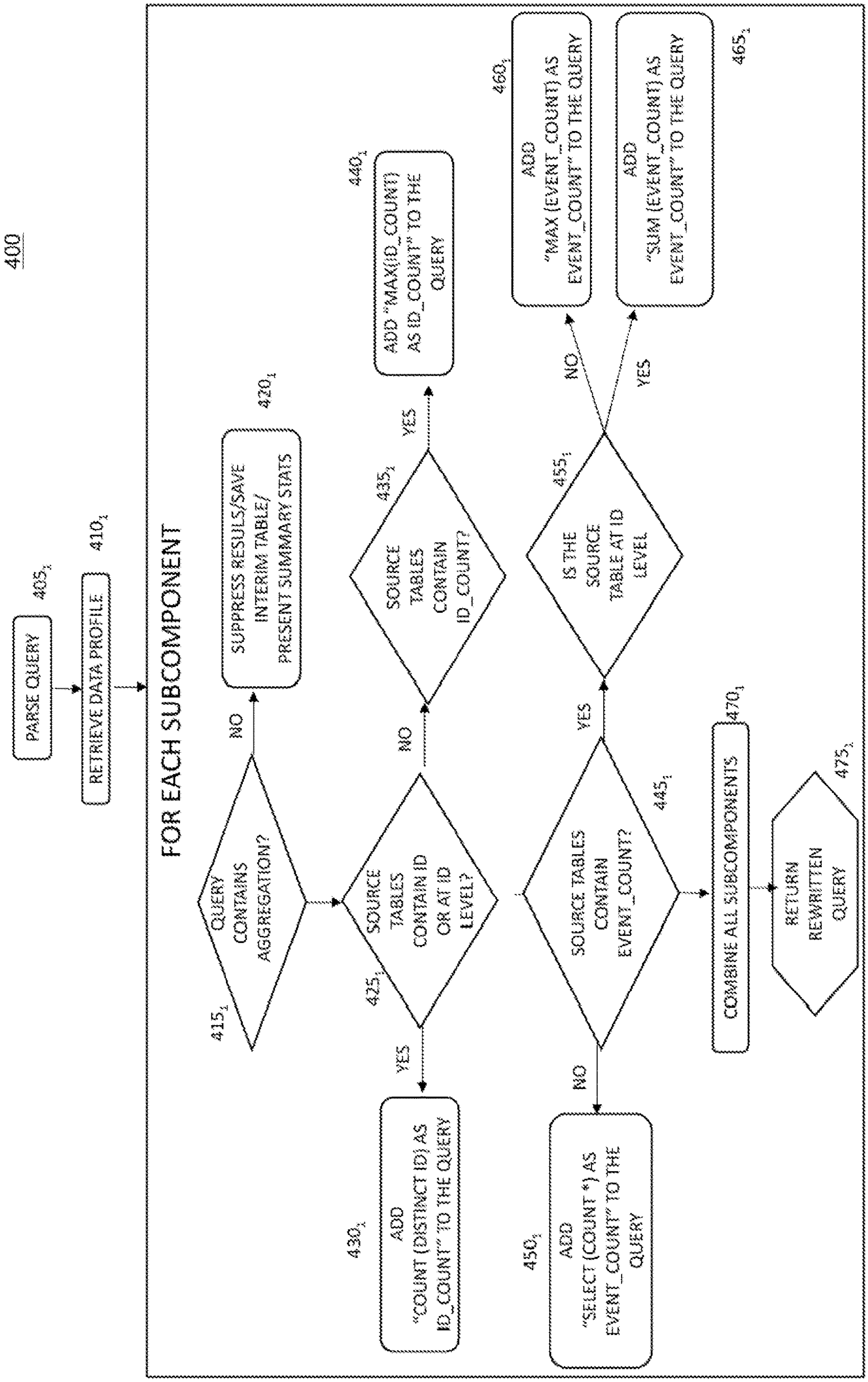
FIG. 4A illustrates a generic method operating in the system of FIG. 3.

FIG. 4A illustrates a generic method $\mathbf{400_1}$ operating in the system of FIG. 3. The query may be parsed and broken into subcomponents at $\mathbf{405_1}$ of method $\mathbf{400_1}$ and the data profile retrieved at $\mathbf{410_1}$. The data profile may contain multiple sensitive identification attributes.

For each subcomponent it may be determined if the query contains aggregation at $\mathbf{415_1}$. If the determination at $\mathbf{415_1}$ is negative, the suppression of results/save interim table and present summary stats may occur at $\mathbf{420_1}$.

If the query did include aggregation at $\mathbf{415_1}$, the source tables are checked to determine if they contain ID or at ID level at $\mathbf{425_1}$. If the determination at $\mathbf{425_1}$ is yes, at $\mathbf{430_1}$ the COUNT (DISTINCT ID) is added as ID_COUNT to the query.

If the determination at $\mathbf{425_1}$ is no, a determination if the source tables contain ID-COUNT may occur at $\mathbf{435_1}$. If the determination at $\mathbf{435_1}$ is yes, at $\mathbf{440_1}$ the MAX(ID_COUNT) is added as ID_COUNT to the query.

At $\mathbf{445_1}$, the source tables a checked to determine if they contain EVENT_COUNT. If at $\mathbf{445_1}$ the determination is no, then at $\mathbf{450_1}$ the SELECT(COUNT *) is added as EVENT_COUNT to the query.

If at $\mathbf{445_1}$ the determination is yes then it is determined if the course table is at ID level at $\mathbf{455_1}$. If the determination at $\mathbf{455_1}$ is yes, then the SUM(EVENT_COUNT) is added as EVENT_COUNT to the query at $\mathbf{465_1}$, and if the determination at $\mathbf{455_1}$ is no, them the MAX(EVENT_COUNT) is added as EVENT_COUNT to the query at $\mathbf{460_1}$.

All of the subcomponents results are combined at $\mathbf{470_1}$ and the rewritten query is returned at $\mathbf{475_1}$.

Figure 4B:
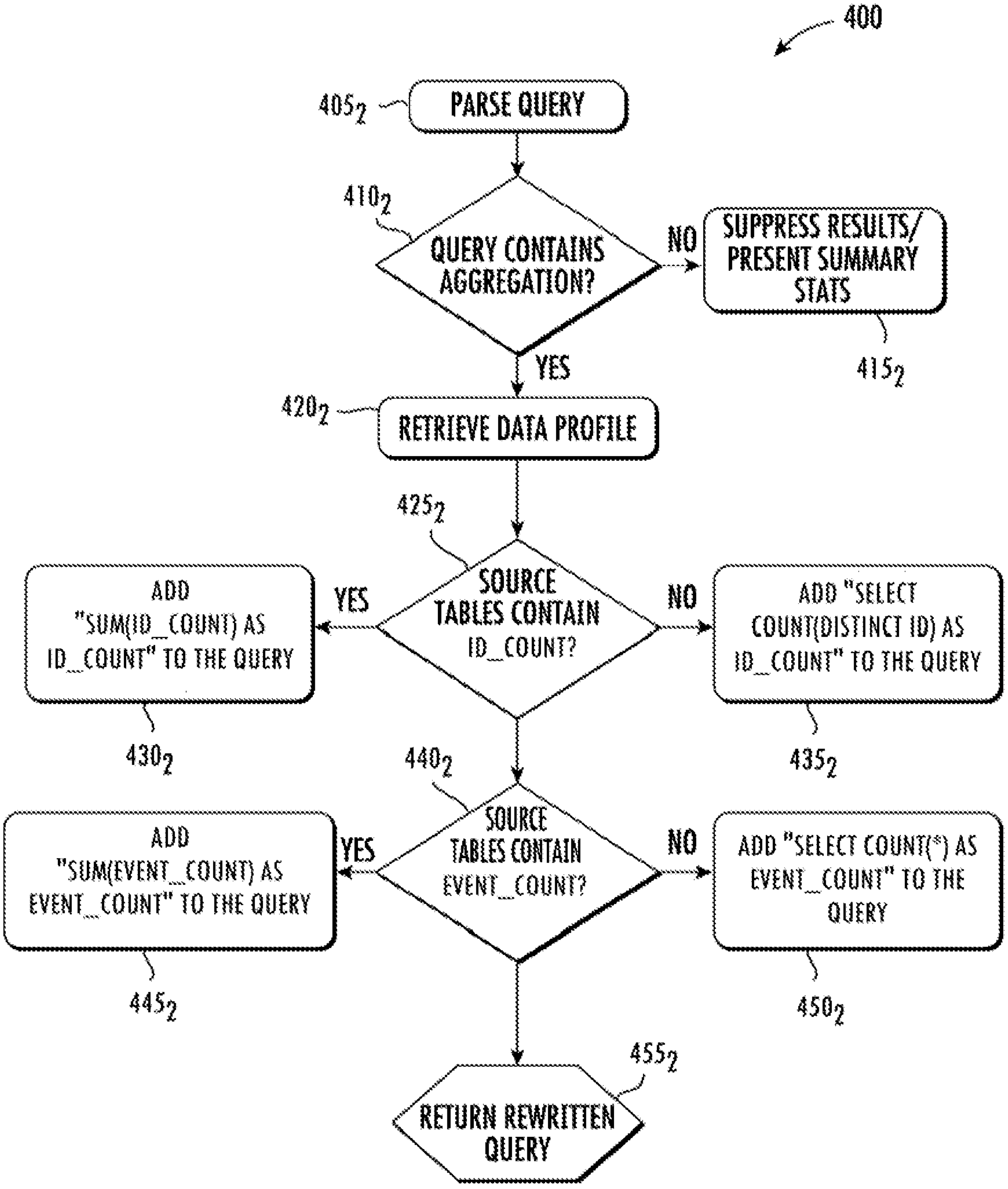
FIG. 4B illustrates an example method for rewriting a single query in the system of FIG. 3.

FIG. 4B illustrates an example method $\mathbf{400_2}$ for rewriting a single query in the system of FIG. 3. The query may be parsed and broken into subcomponents at $\mathbf{405_2}$ of method $\mathbf{400_2}$ and the data profile retrieved at $\mathbf{410_2}$. The data profile may contain multiple sensitive identification attributes. One embodiment for privacy control is the subject id field "ID". Method $\mathbf{400_2}$ may determine if a query includes permitted aggregation at $\mathbf{415_2}$ for each subcomponent. A subcomponent may be a SELECT statement, a subquery, or a nested subquery, or such. For example, a query containing a UNION clause may contain two SELECT subcomponents. If the query does not contain permitted aggregation at $\mathbf{415_2}$, the results may be suppressed, saved in an interim table and summary statistics presented at $\mathbf{420_2}$.

The source tables may be analyzed to determine if the table contains the ID field or at subject ID level at $\mathbf{425_2}$. If the ID field is present, the count field is added to the query as a count over the data subject id field "ID" and given the custom name at $\mathbf{430_2}$. The source tables may be analyzed to determine if the table contains a custom-named field containing a count of data subjects for each record is present at $\mathbf{435_2}$. If the count field is present, the aggregation of the count field is added to the query at $\mathbf{440_2}$ and given the same custom name.

The source tables may be analyzed to determine if a custom-named field containing a count of events represented by each record of an aggregation is present at $\mathbf{445_2}$. If the count field is present, the aggregation of the count field is added to the query and given the custom name if the source table is at ID level or if the source table is not at ID level. If the count field is not present, the count field is added to the query as a count of the number of records and given the custom name at $\mathbf{450_2}$.

Further metadata fields may be added to the rewritten query to aid in detecting other characteristics of the data relating to re-identification attacks, in a similar manner to 425$_2$ and 445$_2$. Multiple meta-data fields may be aggregated at before returning the rewritten query at 455$_2$.

Returning to FIG. 3, the queries may be executed at 350. The final query set is executed against the underlying data store.

Risk mitigation at 355 may be performed. Each rule 360 retrieved at 335 may be applied to the data and scores for privacy risk may be calculated. For example, the Minimum Participation threshold test may identify the following risks (any segments with <100 unique data subjects). As illustrated in Table 4 below, records highlighted do not pass the required Minimum Participation threshold of 100.

TABLE 4

RESULTS WITH MINIMUM PARTICIPATION THRESHOLD IDENTIFIED

| | location_id | total_transactions | unique_data_subjects | max_contribution | min uniqueness risk |
|---|---|---|---|---|---|
| ResultSet Data | 10030402 | 556 | 98 | 0.11 | 0 |
| | 10030403 | 23 | 18 | 0.54 | 0 |
| | 10030404 | 1134 | 366 | 0.07 | 1 |
| | 10030405 | 2243 | 654 | 0.21 | 1 |
| | 10030406 | 766 | 278 | 0.1 | 1 |
| | 10030407 | 56 | 50 | 0.32 | 0 |
| | 10030408 | 5586 | 3120 | 0.05 | 1 |
| | 10030409 | 55 | 45 | 0.55 | 0 |
| | 10030410 | 543 | 118 | 0.71 | 1 |
| | . . . | . . . | . . . | . . . | . . . |

When maximum contribution is applied, this contribution may identify an additional risk (any segment where a single data subject contributes more than 70% of the aggregated value). As illustrated in Table 5 below, the single result highlighted at the bottom does not pass the maximum contribution threshold.

TABLE 5

RESULTS WITH MAXIMUM CONTRIBUTION THRESHOLD IDENTIFIED

| | location_Id | total_ transactions | unique_data_subjects | max_contribution | min uniqueness risk | max contribution risk |
|---|---|---|---|---|---|---|
| ResultSet Data | 10030402 | 556 | 98 | 0.11 | 0 | 0 |
| | 10030403 | 23 | 18 | 0.54 | 0 | 0 |
| | 10030404 | 1134 | 366 | 0.07 | 1 | 1 |
| | 10030405 | 2243 | 654 | 0.21 | 1 | 1 |
| | 10030406 | 766 | 278 | 0.1 | 1 | 1 |
| | 10030407 | 56 | 50 | 0.32 | 0 | 0 |
| | 10030408 | 5586 | 3120 | 0.05 | 1 | 1 |
| | 10030409 | 55 | 45 | 0.55 | 0 | 0 |
| | 10030410 | 543 | 118 | 0.71 | 1 | 0 |
| | . . . | . . . | . . . | . . . | . . . | . . . |

The total risk profile may also be examined. As illustrated in Table 6 below, rows that do not pass either of the Minimum Participation or Maximum Contribution thresholds are highlighted as being risky.

TABLE 6

TOTAL RISK PROFILE IDENTIFYING ROW THRESHOLDS

| | location_id | total_ transactions | unique_data_subjects | max_contribution | min uniqueness risk | max contribution risk | total risk |
|---|---|---|---|---|---|---|---|
| ResultSet Data | 10030402 | 556 | 98 | 0.11 | 0 | 0 | 0 |
| | 10030403 | 23 | 18 | 0.54 | 0 | 0 | 0 |
| | 10030404 | 1134 | 366 | 0.07 | 1 | 1 | 1 |
| | 10030405 | 2243 | 654 | 0.21 | 1 | 1 | 1 |
| | 10030406 | 766 | 278 | 0.1 | 1 | 1 | 1 |
| | 10030407 | 56 | 50 | 0.32 | 0 | 0 | 0 |
| | 10030408 | 5586 | 3120 | 0.05 | 1 | 1 | 1 |

TABLE 6-continued

TOTAL RISK PROFILE IDENTIFYING ROW THRESHOLDS

| | location_id | total_ transactions | unique_data_subjects | max_contribution | min uniqueness risk | max contribution risk | total risk |
|---|---|---|---|---|---|---|---|
| | 10030409 | 55 | 45 | 0.55 | 0 | 0 | 0 |
| | 10030410 | 543 | 118 | 0.71 | 1 | 0 | 0 |
| | . . . | . . . | . . . | . . . | . . . | . . . | |

Once the risk profile is known, any risks may be mitigated in a number of ways. For example, removal of segments, rows or fields containing risky values, allowable Resultset after aggregated segments exceeding thresholds have been removed. As illustrated in Table 7 below, the risky rows highlighted in Table 6 above have been removed or suppressed.

Alternatively, a synthetic version of the Resultset may be presented to the user so the user may understand the kind of data that was returned, without being able to re-identify an individual. The user may choose to have suppressed records or Resultsets aggregated to form a single record or multiple records that pass the defined privacy thresholds when aggregated.

TABLE 7

SUPPRESSION OF RISKY ROWS

| | location_id | total_transactions | unique_data_subjects | max_contribution | min uniqueness risk | max contribution risk | total risk |
|---|---|---|---|---|---|---|---|
| ResultSet | 10030404 | 1134 | 366 | 0.07 | 1 | 1 | 1 |
| Data | 10030405 | 2243 | 654 | 0.21 | 1 | 1 | 1 |
| | 10030406 | 766 | 278 | 0.1 | 1 | 1 | 1 |
| | 10030408 | 5586 | 3120 | 0.05 | 1 | 1 | 1 |
| | . . . | . . . | . . . | . . . | . . . | . . . | |

Removing the offending segments (rather than returning all data to the querying interface) means that the risk of inadvertently exposing sensitive data is removed from the user. The removal allows derived Resultsets to be freely included downstream from the returned result set without concerns that risk is exposed or re-introduced, and without modification to support the handling of risk indicators at a segmentation level.

The privacy score or other such indicator may be used to indicate that data has been removed from the Resultset due to privacy risk without indicating which segments have been removed. The removed data, for example, location_ids, excluding the aggregated values, may be returned in a separate structure for information purposes if beneficial and statistical summaries of removed data may also be provided.

Suppression of the entire Resultset with an explanation as to why suppression occurred, while making the Resultset available in its full form to subsequent queries may occur. In this case, the data profile is updated by the system so that subsequent queries can be accurately assessed for risk. The subsequent queries may need to aggregate the transaction/data subject count fields and pass relevant thresholds before providing to the analyst. In complex query scripting, multiple steps may be required to get the data in a suitable form for final aggregation. These complex query flows are fully supported by the privacy engine so required business intelligence and analytic outputs may be produced.

In a case where the Resultset cannot be shown directly to the user, the user may be informed that the Resultset has been stored in a temporary table and is available for querying/aggregation as part of subsequent queries at 380. Statistical summaries of these Resultsets may be provided so that the user can understand the nature of their contents.

Noise may be added at 370 to individual cells, records or entire Resultsets so that the final values are distorted or blurred relative to the original values. This means certain types of re-identification attacks such as hierarchical differencing attacks are not possible. In certain examples, noise may only be added at a single point. If all input tables identified at 320 have already had noise added (i.e., from previous query submissions), then, in these embodiments, further noise addition is not needed. In certain instances, noise can be either Laplace or Gaussian noise, with or without deterministic noise. Laplace or Gaussian noise may be configured to ensure output cells, records or Resultsets achieve differential privacy. The deterministic noise may be added to prevent averaging out of the added Laplace or Gaussian Noise. In this case the noise is calibrated based on the actual data selected in the query. This calibration is performed at 395 to ensure that all subjects in the Resultset are sufficiently protected. This type of noise is only applicable for aggregate outputs so if the query does not contain an aggregation then this step would be skipped. Note that this step and the addition of noise at 370 could be performed as part of query execution 350.

The Resultset may be returned at 385. The privacy protected Resultset is returned 385 to the querying interface for use by the analyst. The Resultset may be output at 390, such as for use by a user.

Figure 5:
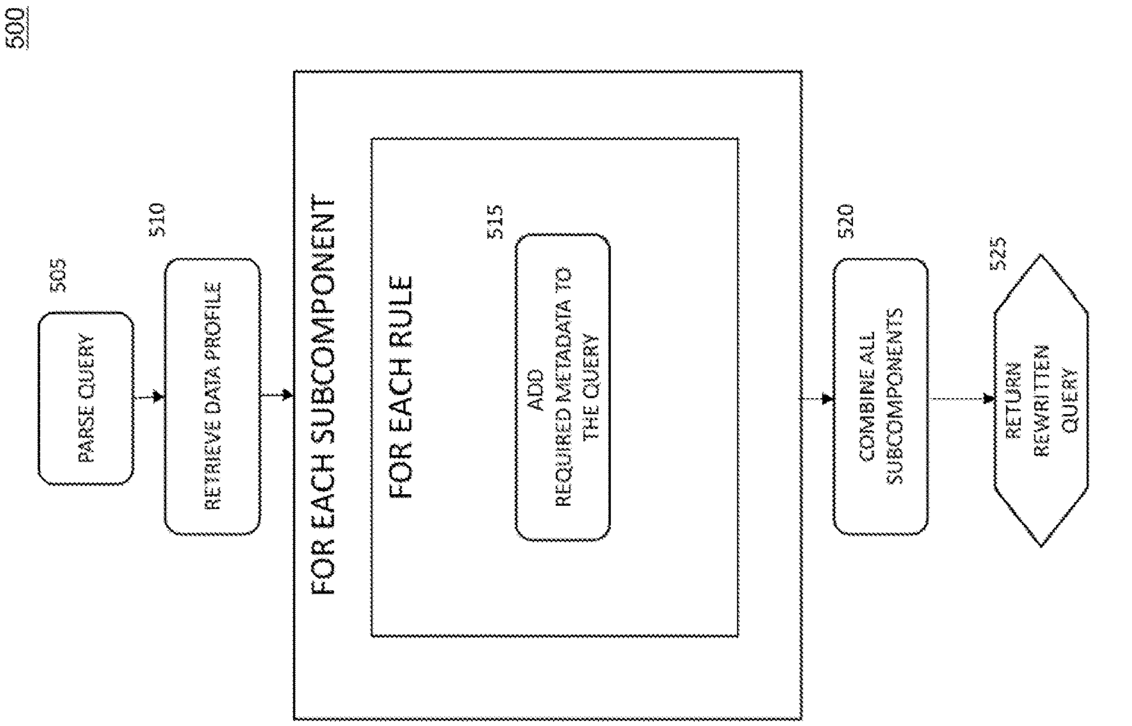
FIG. 5 illustrates a generic query rewriting method.

FIGS. 4A, B and the associated description provide an example to outline the flow for applying Minimum Participation and Minimum Count rules. As would be understood by those possessing an ordinary skill in the art, other rules, such as those discussed herein including Maximum Contribution, Near Total and Maximum Population, for example, and other non-privacy-related rules understandably follow modified flows associated with the rule, FIG. 5 illustrates a generic query rewriting method 500. Method 500 includes parsing the query at 505. At 510, method 500 includes retrieving a data profile at set forth above. For each subcomponent and for each rule, at 515, method 500 includes adding the required metadata to the query. At 520, method 500 includes combining all subcomponents and at 525, method 500 includes returning the rewritten query.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read-only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement the present methods for use in other electronic hardware.

What is claimed is:

1. A system comprising:

at least one processor;

at least one input/output (I/O) interface communicatively coupled to the at least one processor; and wherein the at least one processor programmed to:

access a user-defined query via the I/O interface;

modify the user-defined query so that the modified user-defined query generates metadata;

access a result of the modified user-defined query, the result comprising the metadata, wherein the metadata relating to privacy characteristics and one or more records associated with the user-defined query; and generate a privacy risk determination based on the metadata, wherein re-identification risk is reduced to a user-configured level based on the privacy risk determination.

2. The system of claim 1, wherein the processor is further programmed to:

determine that the result is associated with privacy risks above defined thresholds, and wherein to reduce the re-identification risk, the processor is programmed to suppress or alter the result to reduce the risk of re-identification.

3. The system of claim 2, wherein the result is altered, and wherein the processor is programmed to add noise to the result.

4. The system of claim 1 where a data profile defines one or more sources of potential re-identification risk in a database schema.

5. The system of claim 1 wherein one or more privacy rules are applied by the processor and the one or more privacy rules are configurable for different database tables.

6. The system of claim 1 where thresholds for different types of privacy risk are configured.

7. The system of claim 1 wherein one or more aggregated query results from the user-defined query are scored relative to one or more configured privacy rules and thresholds.

8. The system of claim 1 wherein the processor is further programmed to measure one or more privacy risks in query results and mitigates the risks before returning the query results.

9. The system of claim 8 where mitigation actions are configured to run automatically under defined circumstances.

10. The system of claim 8 where mitigation actions are presented to an administrator and selected mitigation actions are applied to query results before being returned.

11. A method comprising:

accessing a user-defined query via at least one input/output (I/O) interface;

modifying the user-defined query so that the modified user-defined query generates metadata;

accessing a result of the modified user-defined query, the result comprising the metadata, wherein the metadata relating to privacy characteristics and one or more records associated with the user-defined query; and generating a privacy risk determination based on the metadata, wherein re-identification risk is reduced to a user-configured level based on the privacy risk determination.

12. The method of claim 11, further comprising:

determining that the result is associated with privacy risks above defined thresholds, and wherein reducing the re-identification risk comprises suppressing or altering the result to reduce the risk of re-identification.

13. The method of claim 12 wherein the result is altered, the method further comprising:

adding noise to the result.

14. The method of claim 11 further comprising defining one or more sources of potential re-identification risk in a database schema.

15. The method of claim 11 further comprising applying privacy rules with the privacy rules being configurable for different database tables.

16. The method of claim 11 further comprising configuring thresholds for different types of privacy risk.

17. The method of claim 11 further comprising scoring aggregated query results relative to one or more configured privacy rules and thresholds.

18. The method of claim 11 further comprising measuring one or more privacy risks in database query results and mitigating the one or more privacy risks before returning query results.

* * * * *